G. L. ROCK.
POWER TRANSMITTING DEVICE.
APPLICATION FILED JUNE 3, 1918.
1,354,777.
Patented Oct. 5, 1920.
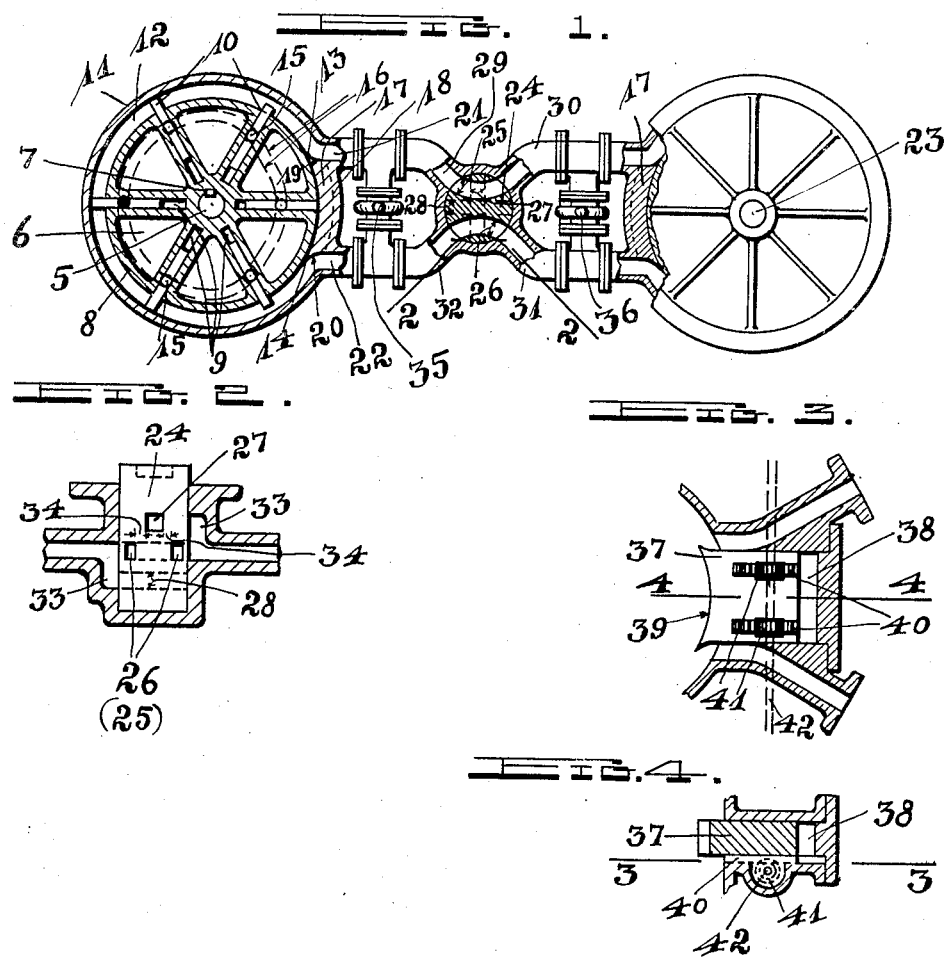
WITNESSES:
INVENTOR
Gilbert L. Rock.

UNITED STATES PATENT OFFICE.

GILBERT L. ROCK, OF LOS ANGELES, CALIFORNIA.

POWER-TRANSMITTING DEVICE.

1,354,777.  Specification of Letters Patent.  Patented Oct. 5, 1920.

Application filed June 3, 1918. Serial No. 237,906.

*To all whom it may concern:*

Be it known that I, GILBERT L. ROCK, a citizen of the United States, residing at Los Angeles, in the county of Los Angeles and State of California, have invented a new and useful Power-Transmitting Device, of which the following is a specification:

This invention relates to devices for transmitting the power from one shaft to another; and has for its main object to transmit the power from the transmitting shaft to a power receiving shaft by the use of liquid, stored and compressed on the transmitting shaft and used as driving means on the power receiving shaft.

Another object is to provide a motor on the driving shaft by which a liquid is stored and compressed to be used on the power receiving shaft.

Another object is to provide a motor on the power receiving shaft which can be operated by a liquid received from the liquid storing and compressing motor on the power transmitting shaft.

Another object is to provide a device which can be used as a, or in place of the differential gearing in automobiles or in similar places.

Another object is to provide a device which can be used as a pump for compressing a liquid and transmitting the liquid to a power receiving device or other suitable place.

Another object is to provide a device which can be used as a pump and also as a rotary motor, of the rotary type.

Another object is to provide a device of the character indicated above to take the place of change-speed gears in automobiles.

Another object is to provide a device of the character indicated above to take at the same time the place of brakes in automobiles.

Another object is to provide a device of the character indicated above which will transmit the full power to the other wheel if one wheel is slipping, in automobiles and similar places.

Other objects will appear from the following description and appended claim as well as from the accompanying drawing, in which—

Figure 1 is a side elevation of my device, partly in midsection.

Fig. 2 is a section of the direction changing valve of the device on line 2—2 of Fig. 1.

Fig. 3 is an operating valve of slightly modified construction in section on line 3—3 of Fig. 4.

Fig. 4 is a cross section of the operating valve in Fig. 3 on line 4—4.

In Fig. 1, 5 designates the driving shaft to which the rotating wheel 6 is keyed as indicated at 7. The rotating wheel is provided with a flange 8 and a suitable number of recesses 9. Valves or gates 10 are slidingly mounted in the recesses 9 of the rotating wheel 6. The housing 11 is suitably formed to leave a space or channel 12 between the housing and a section of the periphery of the rotating wheel while the remaining section of the rotating wheel is closely engaging with the housing as illustrated between the numerals 13 and 14. The gates 10 are provided with extension ends 15, projecting sidewise from the gates into suitably formed grooves 16, provided in the sides of the housing. Preferably, such grooves 16 are in the opposite sides of the housing, equally formed, facing the inside of the housing, so as to guide the gates 10 by their extension ends 15 to slidingly engage with the larger part of the housing, while withdrawing the gates to pass the narrower part of the housing between the numerals 13 and 14 in such withdrawn position within the recess of the rotating wheel, as will easily be understood from the illustration. The narrower part of the housing between the numerals 13 and 14 forms the checking block 17, which, though shown as solid with the housing, may preferably be an independent member suitably secured to the inside of the housing on line 18, indicated in dotted lines. This checking block is provided with deflecting and guiding curves 19 and 20, checking and guiding the liquid from the channel 12 in the upper part of the housing into the outlet 21 and from the intake 22 into the lower part of the channel 12. Making the checking block an independent part secured to the housing allows an absolutely circular facing to the inside of the housing.

On the shaft 23 is mounted a similar rotating wheel with valves or gates inclosed by a similar housing as described above.

The pressure, produced by the motor described above and illustrated to the left in Fig. 1, is used as the driving power for the motor shown in side elevation to the right in the same figure.

The direction changing valve 24 between the two motors is illustrated in cross section in Fig. 2. The rotating center body is provided with the two curved conduits 25 and 26, the cross conduit 27 and the longitudinal conduit 28; the curved conduits 25 and 26 being on the same level, the cross conduit above the curved conduits, and the longitudinal conduit below the curved conduits. The connecting conduits 29, 30, 31 and 32 are provided with upwardly or downwardly leading communicating conduits 33, the conduits 30 and 32 preferably with the upwardly leading communicating conduits, while the conduits 29 and 31 are provided with the downwardly leading communicating conduits, though it may be in the opposite manner.

In the position illustrated in Fig. 1, when rotating the shaft 5 with the rotating wheel secured thereto, the liquid is naturally sucked or drawn in from the intake 22 through the channel 12 and pressed out through the outlet 21, passing through the curved conduit 25 into the motor on the shaft 23, transmitting the rotating motion of the motor on the shaft 5 to the motor on the shaft 23, as will easily be understood. The liquid passing out of the motor on the shaft 23, passes through the curved conduit 26 back into the motor on the shaft 5.

When using this device as a pump, the conduit 22 will naturally be used to draw the liquid and the conduit 21 to deliver the liquid, and no second motor is necessary in such case.

When using this device on automobiles or similar devices, the motor on the shaft 23 is coupled or connected with one or more of the wheels of such vehicles or devices.

Putting one motor on each of the rear wheels, makes it possible to eliminate the differential gearing in such vehicles, the motor on each wheel being capable of producing the same effect as obtained by the differential gearing, as will easily be understood. Having one motor on each of the driving wheels eliminates also the slipping of one wheel, very common with differentials, this advantage being especially important in trucking.

If the shaft 5 is capable of reversing, the whole system and the direction of the shaft 23 can naturally be reversed, if, however, a reversing of shaft 5 is not possible, the reversing of shaft 23 is accomplished through the several conduits in the valve 24. Turning the valve 24 to a suitable distance to bring the conduit 28 to aline with the connecting conduits 29 and 31, and the conduit 27 to aline with the connecting conduits 30 and 32, naturally connects the outlet 21 to the motor on shaft 23 in the opposite manner as described above, the pressure from the outlet being directed through the connecting conduit 29, through the longitudinal conduit 28 in the valve 24, through the connecting conduit 31 into the lower part of the motor on the shaft 23, while the pressure as described above entered the motor on shaft 23 in the upper part.

If the motor on shaft 23 is to be stopped while the motor on shaft 5 is running, it naturally requires that the space 34, see Fig. 2, between the conduits should be at least larger than the width of such conduits, providing a neutral position in this valve, which can easily be had, as will easily be understood.

Running the motor on shaft 5 at normal speed, the motor on shaft 23 is controlled by the operating valve 35, by allowing more or less of the pressure produced in the motor on shaft 5 to circulate back to that motor through the operating valve 35. The motor on shaft 23 requiring power while the pressure can freely circulate through the operating valve 35 when open naturally causes a stopping of the motor on shaft 23 when the operating valve is open.

If the motor on shaft 5 is directly coupled with the driving motor of an automobile such idle circulation is of course necessary, and a starting of the motor on shaft 23 is simply obtained by gradually closing the operating valve 35, thereby very evenly and gradually causing more and more of the pressure to pass over to the motor on shaft 23, as will easily be understood.

Having started the driving force of an automobile, gas-engine, electric motor, or any other suitable motor, and having fully opened the operating valve, the direction changing valve 24 is set in the desired position and then the operating valve 35 gradually closed as described above for starting the motor on shaft 23 as desired.

For coasting when the motor on shaft 5 is running idle through the circulation through the operating valve 35, another circulation similar to this one is provided near the motor on shaft 23 being provided with a brake valve 36. A suitable closing of this brake valve 36 naturally causes a braking or stopping of the motor on shaft 23 as soon as the direction changing valve 24 is closed, or placed in the neutral position mentioned above, the liquid in this motor being not able to freely circulate through the housing since the gates always retain the tendency of pressing the liquid out of one conduit and draw new liquid in at the opposite conduit this being made impossible by the shutting off of the circulation through the brake valve 36.

A modified form of operating valve is illustrated in Figs. 3 and 4, the checking block 17 being enlarged and this enlarged block forming the operating valve 37. For the operating valve 37 a suitable compartment 38 is provided in the housing in which the operating valve is slidingly mounted radially to the rotating wheel 6. The curved face 39 is the same as in the checking block 17 between the numerals 13 and 14, slidingly engaging with the periphery of the wheel 6 when the operating valve 37 is in its closed position. Two small racks 40 are provided on the operating valve 37, with which two small pinions 41 engage. The pinions being on the same shaft 42, in turning this small shaft 42 and thereby the pinions 41, the operating valve block 37 is easily shifted toward the rotating wheel 6 or in the opposite direction. In this modified form no outside overflow with operating valve 35 is necessary the liquid being able to circulate within the housing past the curved face when the operating valve block is withdrawn into the compartment 38.

All these operating valves and direction changing valves allow a very gradual starting, gradually going faster, gradually slowing down, gradually changing from fast to slow and from slow to fast, gradual braking, and trucking as described above.

The details of this motor are described in certain outline, but it will easily be understood that slight changes of details can be made without departing from the invention or the principle of the invention.

Having thus described my invention, I claim:

A device of the class described comprising a pair of housings, a pair of conduits connecting the housings and having their mouths at each housing spaced apart, a checking block located between the mouths of each pair, said blocks projecting within the housings and each having a curved inner face and curved ends, said curved face being concentric with the inner wall of the housing and the curved ends directing fluid to and from the conduits and rotary motors concentrically mounted in the housings and engaging the curved faces of the blocks.

In testimony whereof I hereunto affix my signature in the presence of two witnesses.

GILBERT L. ROCK.

Witnesses:
  OTTO H. KRUEGER,
  PHEBE A. PARKER.